United States Patent [19]

Featherstone

[11] 4,429,535

[45] Feb. 7, 1984

[54] GEOTHERMAL PLANT SILICA CONTROL SYSTEM

[75] Inventor: John L. Featherstone, El Centro, Calif.

[73] Assignee: Magma Power Company, Los Angeles, Calif.

[21] Appl. No.: 177,632

[22] Filed: Aug. 13, 1980

[51] Int. Cl.³ .................................................. F03G 7/00
[52] U.S. Cl. ........................... 60/641.5; 210/170;
   210/714; 210/747; 60/641.2
[58] Field of Search ............... 60/641.2, 641.3, 641.5;
   210/170, 747, 714, 715; 165/45; 159/DIG. 13;
   203/7, DIG. 20

[56] References Cited

U.S. PATENT DOCUMENTS

| | | | |
|---|---|---|---|
| 3,951,794 | 4/1976 | Swearingen | 210/714 |
| 4,127,989 | 12/1978 | Mickelson | 60/641.2 |
| 4,304,666 | 12/1981 | Van Note | 60/641.2 |
| 4,370,858 | 2/1983 | Anerbuch et al. | 60/641.5 |

Primary Examiner—Allen M. Ostrager
Attorney, Agent, or Firm—Albert L. Gabriel

[57] ABSTRACT

A system for reducing silica scaling in a geothermal power plant energized by high temperature, high silica content geothermal brine from a source such as the Salton Sea geothermal field or the Brawley geothermal field. Particulate material capable of seeding silica precipitation thereon is injected into one or more zones in heat extraction equipment such as steam separators where substantial temperature drops occur, so as to seed the precipitation of dissolved silica from the brine in suspended, particulate form rather than as scaling in the heat extraction equipment. The silica precipitation seeding may be accomplished in flash crystallizer type steam separators, and the particulate seed material may be silica particles recovered from a reactor clarifier downstream of the heat extraction equipment.

12 Claims, 1 Drawing Figure

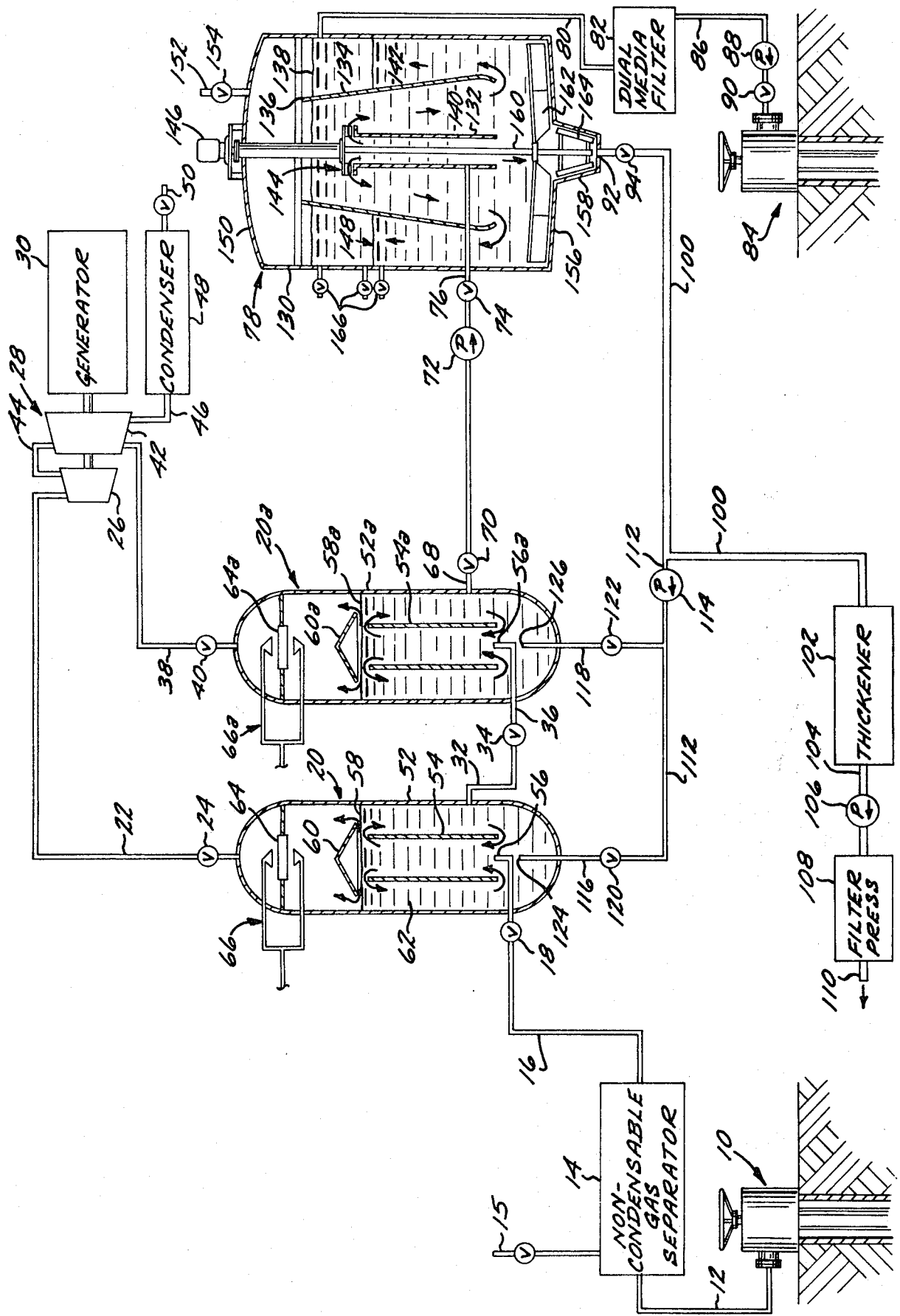

GEOTHERMAL PLANT SILICA CONTROL SYSTEM

BACKGROUND OF THE INVENTION

1. Field of the Invention

The invention is in the field of electrical power production from high temperature geothermal brines which have high dissolved silica content.

2. Description of the Prior Art

Some very high temperature geothermal brine resources are known which contain large amounts of geothermal energy, but which have heretofore not been usable for the commercial production of electrical power because of a high dissolved silica content. These resources include the Salton Sea and Brawley geothermal fields in the Imperial Valley in California, where underground geothermal brine source temperatures range from about 500° F. to about 620° F. and the dissolved silica content is at substantially the saturated level for these brine source temperatures, ranging from about 500 to about 600 parts per million by weight. This high silica content appears to result from the nature of the porous rock formations in the high temperature brine sources in geothermal fields of this type.

Extensive flow testing of high temperature, high silica Salton Sea field brines has been carried out in a simulated geothermal power plant at Niland, Imperial County, California, where the high temperature geothermal brine is flowed up through a production well under the power of its own flashing steam, then flowed through a heat extraction facility simulating a geothermal electrical power generating plant, and then pumped back into an underground formation through a reinjection well spaced a considerable distance from the production well. This testing operation at Niland, although making use of the best state-of-the-art technology, revealed that the high, substantially saturated dissolved silica content in this type of high temperature geothermal brine resource causes so many problems in both plant equipment and reinjection equipment that it would not be practical to attempt to produce electrical power on a commercial scale from this type of geothermal resource using prior art technology.

The basis for these problems is that the saturation amount of silica lowers as the temperature of the brine drops when the brine flows up through the production well, passes through the heat extraction equipment of the plant, and is flowed down into the reinjection well. The silica saturation curve drops down only gradually from the approximately 500° F. to 620° F. underground source temperature as the brine flows up through the production well casing and the temperature is reduced to a typical wellhead temperature on the order of about 400° F. to 500° F.; and the silica saturation curve still does not drop down very steeply in relatively high temperature heat extraction equipment of the plant, for example, in a temperature range of from 400° F. to 500° F. at the wellhead down to perhaps 320° F. to 375° F. after flashing in a first stage flash vessel. However, the silica saturation curve then drops off much more steeply below these temperatures, and particularly in relatively low temperature heat extraction equipment of the plant, for example in a temperature range of perhaps 240° F. to 260° F. after flashing in a second stage flash vessel; and in reinjection equipment where the brine temperature may drop down as low as about 220° F., which would be several degrees Fahrenheit below boiling for brines of this type which have high mineral content.

Since the silica saturation curve descends only gradually in the temperature range of the production well bore, and the silica precipitation reaction is a slow one, little or no silica scaling is likely to occur in the production well bore. This also holds true for production brine input conduits of the plant where the brine temperature is still high and residency time is brief. However, the increasingly steep silica saturation curve for the relatively large temperature drops in successive flash vessels or other heat extraction apparatus such as heat exchangers in a binary system, and the further temperature drops associated with reinjection equipment, coupled with a considerable residency time of the brine in such heat extraction and reinjection equipment, will cause silica to precipitate out of the brine in material quantities in relatively high temperature heat extraction equipment, and in large quantities in relatively low temperature heat extraction equipment and reinjection equipment. Such silica precipitation occurs principally as scaling in the form of a hard, rock-like glaze on the inner walls of flash vessels or heat exchangers in the heat extraction apparatus, in various conduits, and most importantly in the reinjection well casing where the precipitated silica causes rapid plugging that will lead to loss of the well.

Such silica scaling causes progressive reduction in the amount of geothermal brine a plant can process, and also reduction in the heat extraction efficiency for the amount of brine that is being processed. The silica scaling is so tough that it is difficult to remove, and some equipment would have to be replaced; at the same time, such attempts to remove silica scaling or replace scaled parts would involve downtime for plant equipment. Once a reinjection well becomes plugged to the extent that it will not pass a sufficient flow rate of geothermal brine back down into the aquifer for efficient plant operation, the well is lost and a new reinjection well must be prepared at great expense.

One prior art method for controlling mineral precipitation in connection with a geothermal electrical power plant was taught in U.S. Pat. No. 3,757,516 issued to Barkman C. McCabe. That patent taught the principle of deep well pumping in the geothermal brine production well and pressurization throughout the entire plant system on through reinjection to avoid loss of the heat of vaporization from that portion of the brine which would otherwise flash to steam in the production well, and incidentially to reduce mineral precipitation in the brine flow path. However, the said McCabe U.S. Pat. No. 3,757,516 was concerned only with those geothermal resources having a temperature under about 400° F., where the loss of heat of vaporization would represent a loss of a considerable proportion of the available thermal energy, so that flashing in the production well bore would represent a serious energy loss in the system. Also, the mineral precipitation that was of principal concern in that patent was calcium carbonate, which, without the pumping, would be precipitated from brines having a substantial calcium oxide content, due to the release of carbon dioxide from the brine during flashing, and the chemical combining of carbon dioxide with calcium oxide to form the calcium carbonate precipitate.

The pressurization procedure taught in said McCabe U.S. Pat. No. 3,757,516, while effective to prevent some types of scaling such as from calcium carbonate, would, however, not be effective to prevent dissolved silica from precipitating out on walls of heat extraction and reinjection equipment of a geothermal power plant, as such silica precipitation depends only upon temperature reduction to put the dissolved silica in a supersaturated condition, and time for the slow silica precipitation reaction to occur. Nevertheless, the relatively low geothermal hot water or brine source temperatures to which that patent applied (below about 400° F.) did not carry the large quantities of silica (even if saturated with silica) that are found at substantially the saturation level in very hot brines ranging from about 500° F. to about 620° F. in geothermal energy resources like the Salton Sea and Brawley geothermal fields. It is these large quantities of silica in very hot brine which heretofore have presented insurmountable problems in attempts to utilize thus huge thermal potential energy resource for the commercial generation of electrical power.

U.S. Pat. No. 4,043,129 issued to Barkman C. McCabe and Edward Zajac applied the deep well pumping concept of the earlier McCabe U.S. Pat. No. 3,757,516 to high temperature geothermal brines above about 500° F. The McCabe-Zajac U.S. Pat. No. 4,043,129 taught that the advantages of deep well pumping, including avoidance of the loss of heat of vaporization and reduction of mineral precipitation, could be realized in connection with very high temperature geothermal brines by mixing a high temperature geothermal brine which might have a relatively high mineral content derived from a relatively deep well with a lower temperature brine that might have a relatively low mineral content derived from a shallower or peripheral well, to produce a brine mixture of sufficiently lowered temperature to be within the practical temperature and pressure ranges for pumping and which may also have a lowered mineral content. However, this still would not solve the serious silica scaling problem in plant and reinjection equipment where the high temperature brines had a dissolved silica content proximate saturation levels at source temperatures, the situation in the Salton Sea and Brawley geothermal fields.

Some more recent prior art work has involved the use of a reactor clarifier, a type of apparatus known in the sewage treatment art, in an attempt to reduce the silica content of high temperature, high silica geothermal brines so as to protect reinjection well equipment against silica plugging. A publication regarding such use of a reactor clarifier was made at the Second Invitational Well-Testing Symposium of October 25–57, 1978 at the University of California, Berkeley, by Robert H. Van Note, John L. Featherstone and Bernard Pawlowski, entitled "A Cost-Effective Treatment System for the Stabilization of Spent Geothermal Brines". However, this only involved the lower temperature tail end part of a proposed geothermal electrical power plant, and did not have any effect on the silica precipitation problem in heat extraction apparatus such as steam separators or heat exchangers. Thus, where a plurality of steam separators in successively lowering temperature and pressure ranges were contemplated for a geothermal electrical power plant, the use of a reactor clarifier in a downstream lower temperature position could not check the silica from starting to precipitate out onto walls of a first stage steam separator or from precipitating out in large quantities on walls of a second stage steam separator, as well as in associated conduits.

SUMMARY OF THE INVENTION

In view of these and other problems in the art, it is a general object of the present invention to make available for the first time for the production of electrical power on a commercial basis the large, high temperature geothermal resources such as the Salton Sea and Brawley geothermal fields in which a high dissolved silica content has heretofore made commercial electrical power production impractical.

Another object of the invention is, in a geothermal electrical power plant utilizing high temperature, high silica content geothermal brine, to provide method and apparatus for causing silica which precipitates out of the brine as the temperature of the brine stream lowers in the plant, to be substantially entirely in suspended, particulate form instead of the usual rock-like scale on the inside of plant components.

A further object of the invention is, in a geothermal electrical power plant of the character described, to precipitate out of the brine in suspended, particulate form sufficient of the dissolved silica to reduce the silica content of the brine to proximate or slightly below saturation for reinjection temperatures, prior to reinjection of the spent brine, so as to avoid plugging of the reinjection well.

A further object of the invention is, in a geothermal electrical power plant of the character described, to provide novel method and apparatus for seeding the precipitation of silica from the geothermal brine so that the precipitation will be in particulate, suspended form, in portions of the plant involving material temperature reductions and dwell times, as for example in steam separators and in a tail end portion of the plant where the brine is finally flashed to proximate atmospheric pressure and temperature, so as to avoid scaling in such portions of the plant and reduce the silica content of the brine sufficiently to avoid scaling in reinjection equipment. A related object is to provide for the removal of such precipitated suspended, particulate silica from the thermally spent brine prior to reinjection.

In a presently preferred form of the invention, the high temperature, high silica content geothermal brine is delivered from a production well to a first stage flash crystallizer in which some of the hot geothermal brine is flashed to steam that is directed to a high pressure stage of a steam turbine electric power generator. The main brine flow stream then passes into a second stage flash crystallizer from which low pressure steam passes to a low pressure turbine stage of the generator, or alternatively heat exchanger means for transferring heat to a power or working fluid in a binary power system. The brine then passes into a reactor clarifier which receives suspended, particulate silica from upstream precipitation and causes further particulate silica precipitation in a reaction zone therein. As the silica particles grow in the reactor clarifier, they settle down from a clarification zone and are collected from the bottom of the reactor clarifier and processed for disposal. The clarified brine stream then is passed to a reinjection well.

An important aspect of the present invention is a feedback system for reinjecting a small amount of silica sludge obtained from the sludge output of the reactor clarifier into each of the flash crystallizer stages for seeding silica precipitation in the flash crystallizers and thereby causing such precipitation to be in particulate, suspended form rather than as damaging scale in the flash crystallizers and associated conduits.

BRIEF DESCRIPTION OF THE DRAWING

These and other objects of the invention will become more apparent in view of the following description and the accompanying drawing, wherein:

The single FIGURE is a diagrammatic view illustrating a presently preferred embodiment of the invention.

DETAILED DESCRIPTION

The drawing shows a presently preferred form of the invention for simultaneously (1) producing electrical power from high temperature geothermal brine, and (2) selectively precipitating in suspended, particulate form, and removing, large quantities of dissolved silica from the brine so as to reduce the concentration thereof to approximately the saturated level at reinjection temperatures and thereby avoid plugging of the reinjection well with precipitated and/or precipitating silica.

Referring to the drawing, a geothermal production well generally designated 10 provides underground access to hot geothermal brine of the type to which the present invention is applicable, namely, hot geothermal brine having physical and chemical characteristics which make it particularly attractive as a source of heat energy for the production of electrical power, but which characteristics have, because of the limitations of prior art technology in this field, heretofore precluded the commercial production of electrical power from such brine. The principal physical characteristic of the hot geothermal brine is that it should have a sufficiently high underground source temperature to enable the brine to be flowed up through the well under the power of its own flashing steam, yet with the brine temperature still remaining sufficiently high at the wellhead for the efficient operation of an electrical power generating turbine, directly from steam separated from the geothermal brine, in a binary system wherein one or more working fluids receive heat energy in heat exchange relationship with the brine or with steam separated from the brine and then drive the electrical power generating turbine means, or in a system wherein separated steam both directly drives turbine means and passes heat to a power or working fluid in a binary system. For this purpose it is preferred that the source or bottom hole temperature of the geothermal brine be at least about 450° F., and the wellhead temperature be at least about 350° F.

A chemical characteristic of such high temperature source geothermal brine is that it will normally have a high concentration of dissolved silica therein, which is a result of the greatly increased solubility of underground source silica rock formations at high source temperatures as compared with the solubility of silica at lower source temperatures. This characteristically high dissolved silica content of very hot geothermal brine sources has, prior to the present invention, been a major obstacle to the commercial production of electrical power despite very large amounts of thermal energy present in such brine sources, because of the precipitation of large amounts of silica scale in the form of an amorphous glaze inside of vessels and conduits as heat is extracted from the brine and the brine temperature is lowered through a plant system, and rapid plugging of injection wells from such precipitated scale.

An example of a geothermal resource to which the present invention is applicable is the Salton Sea geothermal field, sometimes referred to as the "Salton Sea geothermal anomaly", located in the Niland region of the Imperial Valley in California. Another example of a geothermal resource to which the present invention applies is the Brawley geothermal field, also in the Imperial Valley. Several geothermal wells have been drilled to different depths by Magma Power Company of Los Angeles, Calif. in the Salton Sea geothermal field, and the applicant and others associated with Magma Power Company have extensively tested brines supplied from these wells. A relatively shallow one of these wells provides geothermal brine at a bottom hole source depth of 2100 feet which has a temperature of about 515° F. to 520° F. The brine from this well contains between about 550 and 600 ppm (parts per million by weight) dissolved silica ($SiO_2$). A deeper one of the Magma Power Company wells at the Salton Sea geothermal field, providing access to geothermal brine at a depth of approximately 4,000 feet, produces brine having a source temperature of approximately 620° F., with approximately the same proportion of dissolved silica as found in the brine of the 2100 foot deep source. The dissolved silica is at substantially the saturated level for the brine temperature of both these geothermal brine sources, since the silica saturation curve generally levels off in the range of these temperatures.

In the Brawley geothermal field, test wells with depths on the order of about 6,000 to 8,000 feet have produced geothermal brines having source temperatures of about 500° F. to 550° F., with about 500 to 600 ppm dissolved silica.

Referring again to the drawing, the geothermal brine well 10 will be assumed by way of example only, and not of limitation, to have the physical and chemical characteristics of the aforesaid 2100 foot deep Magma Power Company well in the Salton Sea geothermal field. Thus, this brine has a source or bottom hole temperature of between about 515° F. and 520° F. The temperature of this geothermal brine at the wellhead after it has flowed up under the power of its own flashing steam will be on the order of about 400° F. The hot geothermal brine exits the well 10 through supply conduit 12 which feeds the brine through a non-condensable gas separator 14 to brine input conduit 16 having control valve 18 therein, the input conduit 16 passing the high temperature brine into a high pressure flash crystallizer 20. The non-condensable gas separator 14 is preferably located near the wellhead, which helps to eliminate surging of the brine in the flow system of the plant, as otherwise the non-condensable gases tend to come out of the brine at pipe elbows, valves, and the like, and then redissolve, tending to cause surging. In the present example, the non-condensable gases separated from the brine stream at separator 14 will constitute from about 0.1 to about 0.3 percent by weight of the total brine flow, with about 99% of the non-condensable gas being $CO_2$, and a very small proportion being $H_2S$. The non-condensable gases may be vented from separator 14 to atmosphere through vent means 15, or may be otherwise disposed of or utilized.

There will be a continuous flashing to steam of some of the hot geothermal brine in the high pressure flash crystallizer 20, and this high pressure steam will be fed from the top of flash crystallizer 20 through high pressure steam conduit 22 having control valve 24 therein to high pressure stage 26 of multistage steam turbine 28 which drives an electric power generator 30.

After flashing, the geothermal brine in the high pressure flash crystallizer 20 will have a temperature on the order of about 320° F. at a pressure of approximately 75 psia (pounds per square inch absolute). The remaining brine then flows out of high pressure flash crystallizer 20 through brine outlet conduit 32 having control valve 34 therein, and then through a brine input conduit 36 into a low pressure flash crystallizer 20a where the brine is again allowed to flash into steam, this time at a pressure on the order of about 22 psia. The resulting steam is conducted from the top of low pressure flash crystallizer 20a through low pressure steam conduit 38 having valve 40 therein to a low pressure stage 42 of steam turbine 28. The low pressure stage 42 of the turbine also receives low pressure steam through an exhaust conduit 44 from the high pressure stage 26. The exhaust conduit 46 from low pressure turbine stage 42 leads to a condenser 48, the output 50 of which provides distilled water which may be used for any purpose, as for example for washing de-misters employed in the two flash crystallizers, or as cooling water.

The multiple flash stages provided by the two flash crystallizers 20 and 20a, and the associated multiple-stage turbine means 28, are thermodynamically more efficient in the generating of electrical power than a single stage system would be. An alternative arrangement within the scope of the invention which is also thermodynamically efficient is to utilize the high pressure steam from flash crystallizer 20 to directly drive high pressure steam turbine means as shown, but to transfer heat from the low pressure steam from flash crystallizer 20a in heat exchanger means to a power or working fluid in a binary power system.

The use of flash crystallizers instead of conventional flash drums for flashing pure steam from the geothermal brine enables the considerable temperature drops associated with the respective flashings in the two tanks of the flash crystallizers to be withstood without the formation of any material amounts of silica scale on the walls of the flash tanks and associated conduits; whereas these temperature drops if conventional flash drums where employed in place of the respective flash crystallizers 20 and 20a would, because of the considerable reduction in silica solubility associated with each of the temperature drops, cause a considerable amount of silica scaling in the high pressure flash drum, some silica scaling in the piping between the flash drums, and a huge amount of silica scaling in the low pressure flash drum.

The silica in the brine is substantially at saturation at the well source, and is already in a slightly supersaturated condition at the wellhead because of the reduced temperature. Nevertheless, the silica precipitation reaction is a very slow one involving considerable chemical inertial lag, and the brine flow is rapid through the well and through the high temperature input flow path to the plant, so that there is minimal silica scaling in the well casing, and there is no observable silica scaling in the high temperature brine flow path from the wellhead to the high pressure crystallizer 20 defined by the conduit 12, non-condensable gas separator 14 and conduit 16, despite the temperature drop in the brine of a few degrees Fahrenheit which may occur in this high temperature flow path. Also, data developed by Magma Power Company indicates that the solubility of silica flattens out with increasing temperature as the temperature approaches 400° F. or above. This means that only a small amount will precipitate from solution with temperature drops from wellhead temperatures down to approximately 400° F. This high temperature flow path is preferably thermally insulated to minimize such temperature drop, as a further assurance against silica scaling.

The high pressure flash crystallizer 20 is provided with sufficient liquid brine capacity relative to the sizes of its respective input and outlet conduits 16 and 32 as adjusted by the respective valves 18 and 34 in these conduits, so as to give the liquid brine a residency time within the high pressure flash crystallizer 20 preferably from about 8 to about 10 minutes. The liquid brine will preferably traverse from about 8 to about 12 passes in its flow path within the high pressure flash crystallizer 20 by thermal siphon action of the internal draft tube. With this residency time and the associated temperature drop in the liquid brine, it is inevitable that a considerable amount of silica will precipitate out of the brine within the high pressure flash crystallizer 20. However, the point of introduction of the high temperature geothermal brine into the flash crystallizer 20, the recirculating path of the brine within the flash crystallizer 20, and the recycling of a small percentage of the silica sludge separated out at the tail end of the plant into the flash crystallizer to provide seed particles of silica cumulatively presenting large surface areas of silica suspended within the brine onto which precipitating silica will form, all contribute to cause most of the silica which precipitates out in the high pressure flash crystallizer to do so in suspended, particulate form so as to flow with the brine, and so that very little, if any, silica scale will form on the walls of the flash crystallizer 20.

Because of the reduced solubility of silica in the lower temperature range of the second flash crystallizer 20a, much more silica will precipitate out of the geothermal brine in the second flash crystallizer 20a than in the first flash crystallizer 20. However, the point of introduction of the brine into the flash crystallizer 20a, the recirculating path of the brine therein, and the recycling of a small amount of silica sludge from the tail end of the plant into the flash crystallizer 20a, all contribute in the same manner as in the flash crystallizer 20 to seed the large amount of precipitating silica onto the silica sludge particles already in the flash crystallizer 20a, so that most of the silica that precipitates out in the low pressure flash crystallizer 20a will, like that of the high pressure flash crystallizer 20, be in suspended, particulate form that will flow with the brine stream. The silica that is precipitating in the two flash crystallizers will form in growing, amorphous particles, starting with minute monomer particles $SiO_2$ and growing into polymeric silica particles $(SiO_2)_n$.

Flash crystallizer 20 includes an elongated, cylindrical tank 52 having hemispherical end closures and having its axis generally vertically arranged. A vertical draft tube 54 is concentrically positioned within the cylindrical tank 52. Draft tube 54 is somewhat less than half the overall length of the tank 52, and is located generally in the lower portion of tank 52. The hot geothermal brine is delivered from the well 10 through conduit 16 at an injection orifice 56 directed upwardly and located proximate the lower end of draft tube 54 at the center of draft tube 54. The flow rate of the hot geothermal brine into and out of flash crystallizer 20 is adjusted so that the brine surface level 58 in flash crystallizer 20 is a little above the upper end of draft tube 54. A portion of the hot brine will flash into steam as the brine flows upwardly from injection orifice 56 through the draft tube 54, and this steam will be released at the surface 58 of the brine and flow outwardly around a downwardly cupped conical baffle or deflector 60 spaced above the surface 58 of the brine into the upper portion of the flash crystallizer cylinder 52. Liquid brine agitated by the bubbling steam at surface 58 is deflected downwardly and outwardly by the conical baffle 60 into the cylindrical annulus 62 between draft tube 54 and tank 52, the brine flowing downwardly through the annulus 62, with a portion of the brine leaving flash crystallizer 20 through brine outlet conduit 32 and the remainder of the brine flowing down into the bottom of the flash crystallizer tank 52 and then recirculating upwardly through the draft tube 54. The in and out flow rates of the brine relative to the size of the flash crystallizer tank 52 up to the brine surface level 58 are preferably adjusted so that the brine will, on the average, recirculate in this flow path within flash crystallizer 20 on the order of from about 8 to about 12 times. Heat energy from the brine is utilized to cause this continuous recirculation of the brine upwardly through the draft tube 54 and then downwardly through the outer annulus 62, because the density of the brine within draft tube 54 is lower due to both the bubbling steam and the higher temperature than the density of the brine in the annulus 62.

The steam which has separated from the brine in flash crystallizer 20 passes upwardly through a de-mister 64 which removes any remaining liquid water particles in the steam, and the clean, high temperature steam is then delivered to the turbine 28. A de-mister washer generally designated 66 may be employed to periodically was the de-mister 64 with a fine spray of water, which may be distilled water from the condenser 48.

The construction of low pressure flash crystallizer 20a is preferably similar to that of high pressure flash crystallizer 20. Thus, the low pressure flash crystallizer 20a includes elongated, cylindrical, upright tank 52a having hemispherical ends, with a concentric draft tube 54a located within the lower portion of tank 52a, and with the brine received from high pressure flash crystallizer 20 being introduced through an injection orifice 56a directed upwardly and centered proximate the lower end of draft tube 54a. The brine surface level 58a is a little above the upper end of draft tube 54a but below conical baffle or deflector 60a. Steam de-mister 64a and de-mister washer 66a are disposed in the upper part of tank 52a. Some of the brine flashes to steam as the brine rises in draft tube 54a, and the resulting low pressure steam flows outwardly around baffle 60a and thence through de-mister 64a and is conducted to the turbine 28. The brine is caused to circulate by thermal energy in the same manner and through a similar flow path in low pressure flash crystallizer 20a as in high pressure flash crystallizer 20. Thus, the brine is caused to flow upwardly through and out of the top of draft tube 54a and then downwardly through the annulus 62a between draft tube 54a and tank 52a, and then a portion of the brine will flow out of lower pressure flash crystallizer 20a through brine outlet conduit 68, while the remainder of the brine in flash crystallizer 20a will recirculate back into the draft tube 54a through its lower end. The volume of tank 52a to brine surface level 58a and the rate of flow of the brine into and out of the tank 52a as adjusted by the valve 34 in the inlet line and a valve 70 in outlet conduit 68, are such that the brine will, on the average, circulate between about 8 and about 12 times within the low pressure flash crystallizer 20a.

The average temperature of the brine after flashing in the low pressure flash crystallizer 20a will be approximately 242° F., and brine at this temperature which flows out of low pressure flash crystallizer 20a will contain a relatively large amount of precipitated silica which is in particulate form suspended in the flowing brine. This brine flows from flash crystallizer 20a through the outlet conduit 68, the flow of the brine being maintained by a pump 72 in conduit 68, the flow rate being controllable by a valve 74 downstream of pump 72. The brine then flows through an input conduit 76 into a reactor clarifier generally designated 78 wherein the brine is allowed to flash to approximately atmospheric pressure, which will then lower the temperature of the brine. This will lower the temperature of the brine to approximately the boiling point, which for the brine of the present example is approximately 225° F. The conduit means between low pressure flash crystallizer 20a and reactor clarifier 78 is preferably thermally insulated to minimize temperature reduction and consequent silica scaling therein. As an alternative to flashing into the reactor clarifier 78, a flash tank (not shown) and clarifier feed pump (such as pump 72) could be disposed immediately upstream of the reactor clarifier 78.

The reactor clarifier serves three distinct purposes in the present invention. First, is causes further silica precipitation in suspended, particulate form in the brine so as to lower the dissolved silica content from supersaturated to approximately saturated condition for the temperature of the brine in the reactor clarifier 78, or possibly even lowers the silica content to slightly below saturation at that temperature. Second, the reactor clarifier 78 "clarifies" the brine by removing substantially all of the precipitated, particulate silica from the primary brine flow stream, except only for a very minor quantity of extremely fine silica particles which would not be in any way harmful to the reinjection well. Third, the reactor clarifier 78 provides a source of silica seed particles which are recirculated to both the high pressure flash crystallizer 20 and the low pressure flash crystallizer 20a, and are required to assure that silica which does precipitate in each of the two flash crystallizers will precipitate in suspended, particulate form rather than as a hard, glaze-like scale on surfaces within the two flash crystallizers.

The primary stream of clarified, spent brine is conducted from reactor clarifier 78 through an outlet conduit 80 to pass through a dual media filter 82 which removes any substantial particles that may escape through reactor clarifier 78 prior to passage of the primary brine stream back into the underground aquifer through a reinjection well generally designated 84. The clarified, filtered brine is conducted from the filter 82 to the reinjection well 84 through a conduit 86 having reinjection pump 88 and control valve 90 therein. Since the concentration of dissolved silica in the reinjection brine is at approximately the saturation level for the brine temperature in the reactor clarifier 78, the slowness of the silica precipitation reaction, the high flow rate of the reinjection brine and relatively small temperature drop in the reinjection flow path all cooperate to minimize silica scaling in the reinjection flow path. Once the reinjection brine has flowed to a substantial depth in the reinjection well, the increasing temperatures of the underground formations will bring the temperature of the reinjection brine to above the saturation point for dissolved silica, preventing any possibility of silica scaling below that depth. As an additional assurance against silica scaling in the reinjection brine flow path, both externally of the reinjection well 84 and within the reinjection well 84, it is preferred that the reinjection flow path from reactor clarifier 78 to the wellhead of reinjection well 84 be thermally insulated to minimize the temperature drop therein.

The brine supplied by the geothermal production well 10 of the present example is highly saline, including approximately 220,000 ppm sodium chloride, calcium chloride and potassium chloride salts in relative quantities of approximately four parts sodium chloride, two parts calcium chloride and one part potassium chloride. This very high salt content as compared to the approximately 35,000 ppm salt content for seawater, explains the relatively high boiling point of approximately 225° F. of the spent brine in the reactor clarifier 78. Even these large amounts of chloride salts are still below the saturation level at reinjection temperatures, so that their presence in the reinjection brine does not create a reinjection plugging problem.

Silica sludge is discharged from the bottom of reactor clarifier 78 through a gravity discharge port 92 at a flow rate controlled by a valve 94 which is sufficiently slow to enable particulate silica to accumulate in the bottom of reactor clarifier 78 sufficiently for the silica sludge discharge at port 92 to be thickened preferably to approximately 10% by weight of silica in the sludge. Most of this sludge is then conducted through primary silica sludge conduit 100 to a sludge thickener generally designated 102, which may be a centrifuge or the like, wherein the sludge is further thickened. The sludge is then pumped through a conduit 104 by a pump 106 to a filter press 108 or other de-watering device, with the resulting silica solids being discharged at a port 110.

The silica sludge feedback circuit for providing the silica seeds described hereinabove for seeding the precipitating silica in suspended, particulate form in the two flash crystallizers 20 and 20a includes a sludge feedback conduit 112 which connects with the primary silica sludge conduit 100 to receive a very small fraction of the approximately 10% by weight silica sludge from conduit 100. Sludge feedback injection pressure is provided by a pump 114 in conduit 112, and the conduit 112 divides into a pair of conduits 116 and 118 which furnish the seeding sludge to the respective flash crystallizers 20 and 20a. Valves 120 and 122 in respective feedback conduits 116 and 118 control the rates of flow of the seeding sludge to the respective flash crystallizers 20 and 20a. Sludge feedback conduit 116 terminates at an injection port 124 in flash crystallizer 20 which is preferably located at a centered position proximate the lower end of draft tube 60, as for example spaced a short distance below the brine injection orifice 62. Sludge feedback conduit 118 terminates at a similarly located feedback injection port 126 in flash crystallizer 20a. This positioning of the sludge feedback injection ports provides immediate availability of the silica seed particles to the inflowing brine in each of the flash crystallizers, and the agitation of the brine by the flashing which is occurring up through the draft tubes provides rapid dispersion of the silica seeds through the brine streams flowing in the respective flash crystallizers for maximum availability of the seeds to the precipitating silica.

The flow rates of the silica sludge feedback streams supplied to the respective flash crystallizers 20 and 20a are controlled by the valves 120 and 122 so as to maintain silica seeds in the respective flash crystallizers 20 and 20a in preferred amounts of from about 0.5% to about 1.0% by weight of the total particulate silica content in each of the respective flash crystallizers 20 and 20a. Since much more particulate silica is precipitating out in the low pressure flash crystallizer 20a than in the high pressure flash crystallizer 20, this will mean that a proportionally much larger rate of flow of the feedback silica sludge will be provided to the flash crystallizer 20a than to the flash crystallizer 20. Testing has indicated that below about 0.5% by weight of silica seed particles injected into each of the flash crystallizers 20 and 20a, at least in the early stages of any continuous cycle of operation of a plant, there will not be sufficient seed material surface area to avoid some scaling in the flash crystallizers. Seed particle amounts above about 1% by weight are not desirable since they put an additional solids loading on the system, and also would introduce a thermodynamic penalty because of the relatively low temperature of the feedback sludge. While the temperature differential between the feedback sludge and the brine is much greater for the high pressure flash crystallizer 20 than the low pressure flash crystallizer 20a, this is more than compensated for by the smaller amount of feedback sludge that is required for the flash crystallizer 20 than the flash crystallizer 20a.

The relatively small amount of silica that tends to precipitate out at the relatively high temperature of the geothermal brine in the high pressure flash crystallizer 20 may enable the flow of feedback sludge to the flash crystallizer 20 to be reduced by throttling valve 120 after a continuous cycle of operation of a plant has lasted sufficiently long for the silica particle content in the flash crystallizer 20 to become stabilized in both quantity and dispersion so as to be at least partially self-seeding. This may be after a week or more of continuous plant operation. However, the relatively large amount of silica that will inevitably precipitate out at the relatively low temperature of the brine in the low pressure flash crystallizer 20a will probably necessitate the continuous injection of feedback silica seed particles into the flash crystallizer 20a so that silica seeds in amounts at least from about 0.5% to about 1.0% of the total particulate solids content are maintained in the body of flash crystallizer 20a.

The reactor clarifier 78 has a large, upright cylindrical outer shell 130, with a central vertical draft tube 132 coaxially supported therein. Coaxially supported intermediate the outer shell 130 and central draft tube 132 is a downwardly flaring frusto-conical shell 134 which is radially inwardly cupped proximate its lower end. The lower ends of draft tube 132 and frusto-conical shell 134 are at approximately the same level spaced above the bottom of reactor clarifier 78. The upper end 136 of shell 134 extends above the surface 138 of the brine in reactor clarifier 78, while the upper end of the central draft tube 132 is submerged considerably below the surface 138 of the brine. A reaction zone or well 140 is defined radially between draft tube 132 and shell 134, and a clarification zone or compartment 142 is defined radially between the frusto-conical shell 134 and the outer cylindrical shell 130. Brine is circulated through the reactor clarifier 78 by means of a turbine pump 144 located at the top of draft tube 132, the pump 144 being driven by a motor 144 which is preferably positioned externally of the reactor clarifier tank.

The flow path through which the brine circulates in reactor clarifier 78 is as follows: The brine is directed through input conduit 76 into the inside of draft tube 132, where the turbine pump 144 causes the brine to flow upwardly through draft tube 132, radially outwardly through pump 144, downwardly through reaction zone or well 140, radially outwardly around the cupped lower end of frusto-conical shell 134, and thence upwardly through the clarification zone or compartment 142. The mainstream of brine will overflow out of the reactor clarifier 78 through outlet conduit 80 for delivery to reinjection well 84. A large proportion of the brine which flows downwardly from the reaction zone 140 between the concentric tube 132 and shell 134 will be drawn back up through the draft tube 132 and recirculated through the reaction zone 140. Silica slurry will accumulate in the bottom of the reactor clarifier 78 and be drawn off through discharge port 92.

The reaction zone or well 140 is a region in which silica will precipitate out in suspended, particulate form, both as originating precipitate particles and as growth upon other silica particles which act as seeds. The downwardly increasing cross section of the reaction zone 140 causes corresponding velocity reduction in the brine to accelerate this precipitation reaction. Similarly, the upwardly increasing cross section of the clarification zone 142 causes a corresponding reduction in velocity of the brine flow, and at some level intermediate the ends of the clarification zone 142 this upward velocity of the brine will equal the downward velocity of the majority of silica particles under Stokes' law, and a floating sludge blanket generally designated 148 will be caused to form and remain at that level. This sludge blanket 148 provides a high density, and hence high surface zrea, zone of the suspended silica particles in which silica particle agglomeration and further silica precipitation occur. When the silica particles enlarge to a certain size, either by continued precipitation reaction thereon or by agglomeration, or both, then according to Stokes' law these heavier particles will be enabled to descend contercurrent through the upwelling brine in clarification zone 142 and drop down into the bottom region of the reactor clarifier 78.

The reactor clarifier 78 has a top cover 150 through which there is a vent 152 from the inside of the reactor clarifier to atmosphere, the vent 152 having a pressure valve 154 therein which is adapted to release vapor from within reactor clarifier 78 at slightly above atmospheric pressure. This positive pressure vent to atmosphere, coupled with a sealed system downstream of the flash crystallizer 20a and maintaining of the brine temperature above the boiling point until introduction of the brine into the reactor clarifier 78, cooperate to prevent any introduction of atmospheric oxygen into the system which would otherwise produce iron precipitation contamination and increase the corrosive effect of the brine on low temperature and reinjection equipment. This positive exclusion of atmospheric oxygen from the system is a subject matter of a U.S. patent application of Barkman C. McCabe, Edward Zajac and John L. Featherstone entitled "Geothermal Plant Fluid Reinjection System" filed concurrently with the present application.

The bottom wall 156 of reactor clarifier 78 has a gentle downward slope from its outer edge inwardly, terminating in a downwardly cupped frusto-conical center thickening section 158. Connected to the motor 146 through a slowly rotating rake drive shaft 160 is a plurality of large rake arms 162 that sweep accumulating silica particles radially inwardly from the gently sloping part of bottom wall 156 into the center thickening section 158. A plurality of small rake arms 164 in the center thickening section 158 produce continued concentration of the silica sludge that is forming proximate the bottom of the reactor clarifier and deliver the thickened sludge to the gravity discharge port 92.

If desired, a series of fluid monitoring ports 166 may be provided on the cylindrical shell 130 to enable the clarity of the reinjection brine to be monitored proximate the exit level, and to permit the density of the silica sludge blanket 148 to be monitored.

The reactor clarifier 78 holds a large volume of liquid relative to the rate of brine inflow through conduit 76 and outflow through conduit 80. The turbine pump 144 is a high volume pump which, with a large volume of liquid in the reactor clarifier 78, produces internal recirculation of silica sludge, preferably as many as 10 to 15 times, up through the draft tube 132, down through the reaction well 140, and then back up through draft tube 132 so as to obtain a large amount of solids contact in the reaction well 140 for seeding of the precipitating silica, with a considerable length of time being thus afforded for silica precipitation, preferably on the order of from about 8 minutes to about 12 minutes. The very large silica sludge seeding area available for this extended time interval enables the reactor clarifier 78 to bring the dissolved silica content in the primary brine flow stream down from a supersaturated condition to approximately saturated, or even slightly below saturated, for the temperature of the brine in the reactor clarifier 78.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. The method of reducing silica scaling in a geothermal energy system which has a geothermal brine flow path comprising a production well providing a flow stream of high temperature, high dissolved silica content geothermal brine and heat extraction means, which comprises:

establishing a zone in said heat extraction means in which said geothermal brine stream undergoes a substantial decrease in temperature, continuously introducing into said zone the geothermal brine flow stream from said production well, continuously flashing a portion of said geothermal brine stream into steam and removing such steam for power generating purposes, providing particulate material capable of seeding silica precipitation thereon, introducing said particulate material into said zone so as to seed the precipitation of dissolved silica from said brine, whereby silica which precipitates in said zone will be primarily in suspended, particulate form rather than in the form of scaling.

said zone being of sufficiently large cross-section to slow down the flow rate of said geothermal brine stream as said stream passes through said zone so as to allow sufficient time for the silica precipitation reaction to occur, circulating an unflashed portion of said geothermal brine stream through said zone a plurality of times under thermal power provided by the effects of said flashing, and combining the geothermal brine stream so circulated with the continuous geothermal brine flow stream being introduced into said zone.

2. The method of claim 1, which comprises circulating said geothermal brine stream through said zone at least about 8 times.

3. The method of claim 1, wherein said geothermal brine stream has a residency time in said zone of at least about 8 minutes.

4. The method of reducing silica scaling in a geothermal energy system which has a geothermal brine flow path comprising a production well providing a stream of high temperature, high dissolved silica content geothermal brine and heat extraction means, which comprises:

establishing a zone in said heat extraction means in which said geothermal brine stream undergoes a substantial decrease in temperature, providing particulate material capable of seeding silica precipitation thereon, said introducing said particulate material into said zone so as to seed the precipitation of dissolved silica from said brine, whereby silica which precipitates in said zone will be primarily in suspended, particulate form rather than in the form of scaling, said zone being of sufficiently large cross-section to slow down the flow rate of said geothermal brine stream as said stream passes through said zone so as to allow sufficient time for the silica precipitation reaction to occur, said zone being defined within flash crystallizer means, said flash crystallizer means having a central draft tube therein with its axis generally vertically arranged, and said particulate material being introduced into said flash crystallizer means proximate the lower end of said draft tube.

5. The method of reducing silica scaling in a geothermal energy system which has a geothermal brine flow path comprising a production well providing a stream of high temperature, high dissolved silica content geothermal brine and heat extraction means, which comprises:

establishing a zone in said heat extraction means in which said geothermal brine stream undergoes a substantial decrease in temperature, providing particulate material capable of seeding silica precipitation thereon, and introducing said particulate material into said zone so as to seed the precipitation of dissolved silica from said brine, whereby silica which precipitates in said zone will be primarily in suspended, particulate form rather than in the form of scaling, said zone being of sufficiently large cross-section to slow down the flow rate of said geothermal brine stream as said stream passes through said zone so as to allow sufficient time for the silica precipitation reaction to occur, a plurality of said zones being provided in series in said flow path, said plurality of zones comprising a first relatively high temperature and relatively high pressure zone, and a second relatively low temperature and relatively low pressure zone downstream of said first zone, said particulate material being introduced into said second zone at a greater rate than into said first zone.

6. The method of claim 5, wherein said first and second zones are defined within respective first and second flash crystallizer means in series in said flow path.

7. In a geothermal energy system which has a geothermal brine flow path comprising a production well providing a flow stream of high temperature, high dissolved silica content geothermal brine and heat extraction means, a system for reducing silica scaling which comprises:

structure defining a zone in said heat extraction means in which said geothermal brine stream undergoes a substantial decrease in temperature, means for continuously introducing into said zone the geothermal brine flow stream from said production well, means for continuously flashing a portion of said geothermal brine stream into steam and for removing such steam for power generating purposes, means for introducing particulate material into said zone, so as to seed the precipitation of dissolved silica from said brine, whereby silica which precipitates in said zone will be primarily in suspended, particulate form rather than in the form of scaling on said structure, said zone comprising an enlarged cross-section that slows down the flow rate of said geothermal brine stream as said stream passes through said zone so as to allow time for the silica precipitation reaction to occur, and means for circulating an unflashed portion of said geothermal brine stream through said zone a plurality of times under thermal power provided by the effects of said flashing, said geothermal brine stream so circulated being combined with said geothermal brine flow stream being introduced into said zone.

8. The system of claim 7, wherein said geothermal brine stream circulates through said zone at least about 8 times.

9. The system of claim 7, wherein said geothermal brine stream has a residency time in said zone of at least about 8 minutes.

10. In a geothermal energy system which has a geothermal brine flow path comprising a production well providing a stream of high temperature, high dissolved silica content geothermal brine and heat extraction means, a system for reducing silica scaling which comprises:

structure defining a zone in said heat extraction means in which said geothermal brine stream undergoes a substantial decrease in temperature, and means for introducing particulate material into said zone so as to seed the precipitation of dissolved silica from said brine, whereby silica which precipitates in said zone will be primarily in suspended, particulate form rather than in the form of scaling on said structure, said zone comprising an enlarged cross-section that slows down the flow rate of said geothermal brine stream as said stream passes through said zone so as to allow time for the silica precipitation reaction to occur, a plurality of said structures defining a respective plurality of said zones in said flow path, said plurality of zones comprising a first relatively high temperature and relatively high pressure zone, and a second relatively low temperature and relatively low pressure zone downstream of said first zone, said particulate material being introduced into said second zone at a greater rate than into said first zone.

11. The system of claim 10, wherein each of said structures defining said first and second zones comprises flash crystallizer means.

12. In a geothermal energy system which has a geothermal brine flow path comprising a production well providing a stream of high temperature, high dissolved silica content geothermal brine and heat extraction means, a system for reducing silica scaling which comprises:

structure defining a zone in said heat extraction means in which said geothermal brine stream undergoes a substantial decrease in temperature, and means for introducing particulate material into said zone so as to seed the precipitation of dissolved silica from said brine, whereby silica which precipitates in said zone will be primarily in suspended, particulate form rather than in the form of scaling on said structure, said zone comprising an enlarged cross-section that slows down the flow rate of said geothermal brine stream as said stream passes through said zone so as to allow time for the silica precipitation reaction to occur, said structure comprising flash crystallizer means having a central shaft tube therein with its axis generally vertically arranged, and said introducing means introducing said particulate material into said flash crystallize means proximate the lower end of said draft tube.

* * * * *